UNITED STATES PATENT OFFICE.

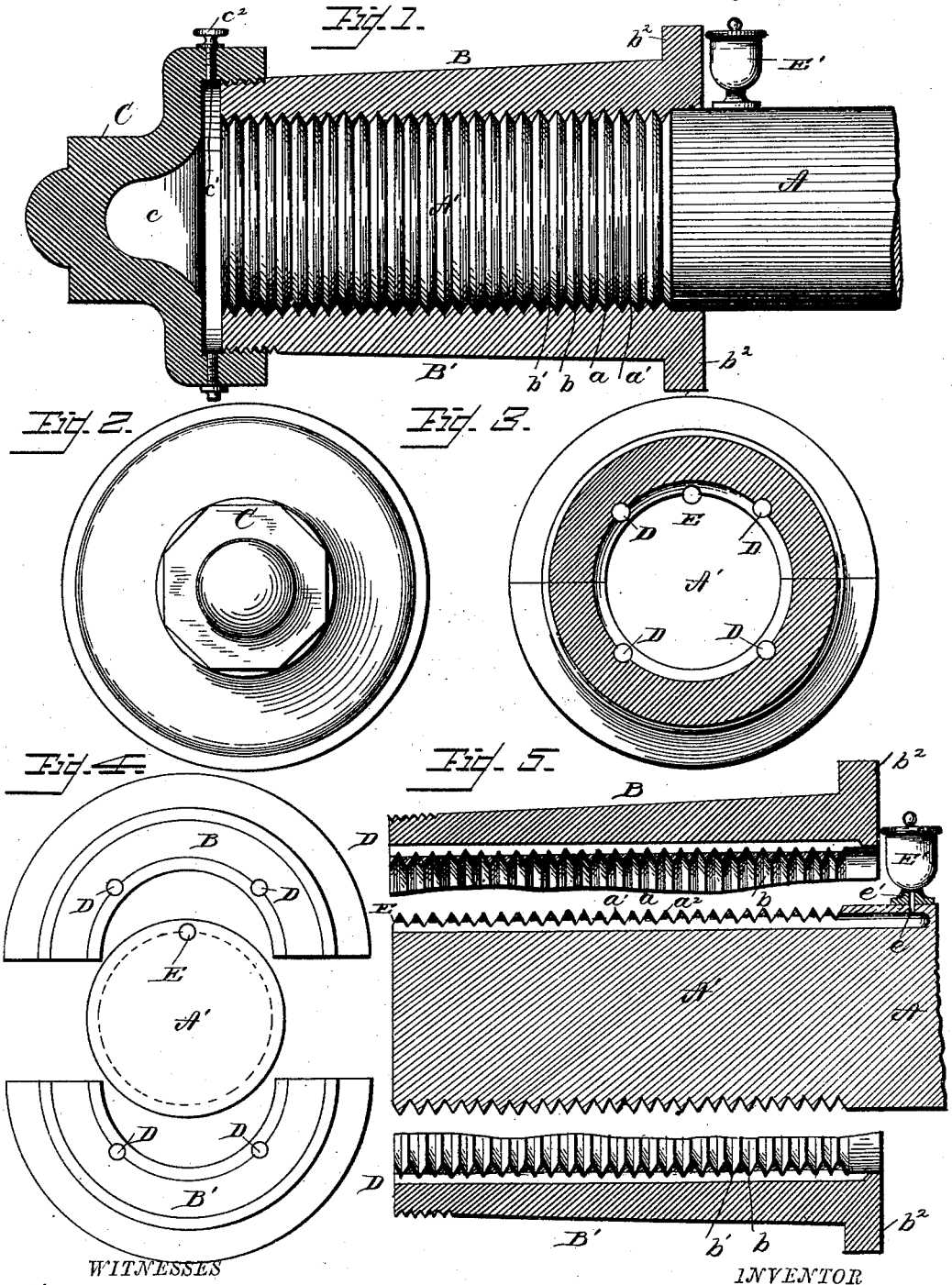

WILLIAM R. AUSTIN, OF NEW YORK, N. Y., ASSIGNOR, BY MESNE ASSIGNMENTS, TO THE AMERICAN INDEPENDENT WHEEL COMPANY.

JOURNAL-BEARING.

SPECIFICATION forming part of Letters Patent No. 302,313, dated July 22, 1884.

Application filed February 28, 1884. (No model.)

*To all whom it may concern:*

Be it known that I, WILLIAM R. AUSTIN, of the city, county, and State of New York, have invented a new and useful Improvement in Journal-Bearings; and I hereby declare the following to be a full and clear description thereof.

This invention relates to that class of journal-bearings which have alternate circumferential grooves and ridges to take up longitudinal thrust-strains and prevent longitudinal movement of the parts; and the especial object of the said invention is to provide means for lubricating the journal-bearing so constructed.

The invention and the details of the mechanism relating thereto will be readily understood by reference to the accompanying drawings, of which—

Figure 1 is a longitudinal sectional elevation of the improved bearing. Fig. 2 is a front elevation of it. Fig. 3 is a transverse sectional elevation taken on the line $x$ $x$ of Fig. 1. Fig. 4 shows a front end elevation of the journal and its two bearings or bushing-pieces, each of the said three parts in this figure being slightly separated from the others, so as to fully illustrate the construction of each. Fig. 5 is a longitudinal sectional elevation of each of the three parts shown in Fig. 4, and as in that figure the parts are each separated from the others for perspicuity of illustration.

The axle or shaft A has its journal A' provided with alternate circumferential grooves, $a$, and ridges $a'$, which take up the longitudinal thrust or strain and prevent a longitudinal displacement of the journal in its bushing or bearing-boxes.

The bushing or bearing-boxes B B' are each semi-cylindrical in form, each constituting one-half of the bearing-box or bushing. These bushings or bearings have transverse grooves $b$ and ridges $b'$, made to conform to the grooves $a$ and ridges $a'$ of the journal. In the examples shown in the drawings these bushings or bearing-boxes are made slightly tapering or conical on the outside, and have an annular flange, $b^2$, at the larger end, and an assembling-nut, C, threaded on the smaller end, as clearly shown in the drawings. The bushings or bearings constructed as above described are especially designed for application to railway-car wheels, though they may well be adapted to other uses. The bushings constructed in this form are first placed upon the journal, and then pushed into the hub of the wheel, which is turned out to fit the exterior of the bushing-pieces, the said bushing-pieces being pushed into the wheel until the flange $b^2$ stops against the inner face of the wheel-hub, and then the assembling-nut C is screwed onto the outer or smaller end of the bushing, and the parts are thus held firmly assembled together. The interior of the nut C is chambered out, so as to form an oil or lubricant chamber or reservoir, $c$, from which the oil or lubricant is fed into the bearings of the journal. This oil-reservoir is filled through an inlet-aperture, $c'$, which is closed exteriorly by the screw-plug $c^2$. For convenience of lubricating, there may be two or more of these lubricating-inlets, so as to use the one which happens to be nearest to the top at the time of lubrication.

The parts of the invention above described are not very much unlike similar or corresponding parts now in use, and are well adapted to independent railway-car wheels and other uses; but the difficulty heretofore experienced in such bearings has been to lubricate them. This difficulty is obviated by the following-described construction:

Each of the bushings or bearing-boxes B B' has a longitudinal channel or duct, D, of, say, one-quarter inch in diameter (more or less) bored from the front end nearly through the entire length of the said bearing or bushing, as shown in the drawings. These channels are bored in so as to have about one half of them cut through the section occupied by the apex of the circumferential grooves $b$, and the other half bored in the solid metal of the piece B or B', as the case may be. There may be one or more of these lubricating-channels bored into each of the pieces B or B', and the outer end of each of the said lubricating-channels is in free and open communication with the oil or lubricating chamber $c$, so that through the said lubricating-channels a free flow of the lubricant is always maintained to each and all of the retaining grooves and ridges of the bearing and journal. A similar lubricating-channel, E, is also bored into the journal from the end of the axle. The said channel E, like those above described for the bearing boxes or bushings, is bored one half through the apex of the grooves a, and the other half in the solid metal of A'. By these means the journals are fully and thoroughly lubricated throughout their entire length, and these bearings are thus fully and completely adapted to the use of independent car-wheels and similar purposes.

For independent car-wheels and similar purposes the axle or shaft A is held stationary and the wheel revolves around it, and for these and similar uses I extend the lubricating-duct E a short distance beyond the inside of the bearing, and by a lateral duct, e, and tube e' connect it with a large oil or lubricating reservoir, E', from which a large amount of lubricant can be fed onto the bearing. The grooves and ridges of this bearing are made sloping on their sides, as shown in the drawings.

I am aware that previous to my invention channels or scores were made in the edges of the ridges formed on the surfaces of the journal and journal-bearings; but such channels are objectionable, in that their sides present knife-edges, which, as the journal revolves, eventually cut out the bearing-surfaces and render the structure useless.

Having described my invention, I claim—

1. A journal-bearing formed of a two-part bushing, each section of which has transverse angular grooves and ridges alternating throughout the entire length of the bearing-surface, and fitted to conform to similar grooves and ridges formed circumferentially on the axle-journal, and each of the said parts of the bushing provided with one or more longitudinal lubricating tubular conduits establishing communication between the transverse thrust-grooves through the bodies of the said transverse ridges, substantially as set forth.

2. A journal-bearing formed with circumferential thrust-grooves and ridges, and provided with longitudinal lubricating channel or duct establishing communication between the transverse thrust-grooves through the bodies of the said transverse ridges, substantially as set forth.

3. The journal A', provided with angular-sided circumferential grooves and ridges alternating, and covering nearly or quite its entire bearing-surface, and a longitudinal lubricating-duct, E, bored through the bodies of the ridges, so as to cut through the apex of each peripheral groove and have a free channel beyond said apex, so as to cause a flow of lubricant of each groove, the said duct to extend inwardly beyond the bearing part, and there be connected by a lateral duct, e, and tube e' with an oil-reservoir, E'.

WILLIAM R. AUSTIN.

Witnesses:
M. RANDOLPH,
G. LINELL.